(12) United States Patent
Dooley et al.

(10) Patent No.: US 7,262,521 B2
(45) Date of Patent: Aug. 28, 2007

(54) VARIABLE AC VOLTAGE REGULATION CONTROL METHOD AND APPARATUS

(75) Inventors: Kevin Allan Dooley, Mississauga (CA); Cameron Todd Walters, Newmarket (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 145 days.

(21) Appl. No.: 10/748,186

(22) Filed: Dec. 31, 2003

(65) Prior Publication Data

US 2005/0146307 A1 Jul. 7, 2005

(51) Int. Cl.
*H02J 1/02* (2006.01)

(52) U.S. Cl. .......................... 307/105; 363/93

(58) Field of Classification Search ................ 307/105; 323/207; 363/93, 91
See application file for complete search history.

(56) References Cited

U.S. PATENT DOCUMENTS

| | | | |
|---|---|---|---|
| 2,349,685 A | 5/1944 | Trucksess | |
| 3,099,786 A | 7/1963 | Friedrich et al. | |
| 3,621,374 A | 11/1971 | Kettler | |
| 3,763,413 A | 10/1973 | Wattenbarger | |
| 4,217,620 A | 8/1980 | Masson | |
| 4,245,288 A | 1/1981 | Frosch et al. | |
| 4,435,746 A | 3/1984 | Barnett | |
| 4,473,811 A | 9/1984 | Schauble | |
| 4,924,125 A | 5/1990 | Clark | |
| 5,008,612 A * | 4/1991 | Otto | 324/117 R |
| 5,162,982 A | 11/1992 | Mentler | |
| 5,355,299 A | 10/1994 | Carpita | |
| 5,545,971 A | 8/1996 | Gomez et al. | |
| 5,663,635 A | 9/1997 | Vinciarelli et al. | |
| 5,703,767 A | 12/1997 | Stacey | |
| 5,712,554 A | 1/1998 | Lace | |
| 5,883,503 A | 3/1999 | Lace | |
| 5,898,287 A * | 4/1999 | Roberti et al. | 318/605 |
| 5,914,865 A | 6/1999 | Barbehenn et al. | |
| 6,100,781 A | 8/2000 | Raets et al. | |
| 6,239,509 B1 | 5/2001 | Rader, III et al. | |
| 6,879,142 B2 * | 4/2005 | Chen | 323/316 |
| 2005/0041437 A1 | 2/2005 | Chian et al. | |

FOREIGN PATENT DOCUMENTS

| | | |
|---|---|---|
| GB | 599018 | 3/1948 |
| JP | 57120321 | 7/1982 |
| JP | 58040808 | 3/1983 |
| JP | 7235427 | 9/1995 |
| JP | 2005-33867 | 9/1996 |
| JP | 2000299232 | 10/2000 |
| WO | WO-02/056451 | 7/2002 |
| WO | WO-03041266 | 5/2003 |
| WO | WO-03/094334 | 11/2003 |

* cited by examiner

*Primary Examiner*—Shawn Riley
(74) *Attorney, Agent, or Firm*—Ogilvy Renault LLP

(57) ABSTRACT

A method and apparatus is disclosed for providing a regulated voltage output from a variable voltage source, alternately using saturation control and cancelling control to regulate output.

29 Claims, 7 Drawing Sheets

__US 7,262,521 B2__

VARIABLE AC VOLTAGE REGULATION CONTROL METHOD AND APPARATUS

TECHNICAL FIELD

This invention relates to the field of power regulation electronics. More precisely, this invention pertains to the field of voltage regulation.

BACKGROUND OF THE INVENTION

A permanent magnet starter/generator (PMSG) or integral starter/generator (ISG), collectively referred to herein as a permanent magnet starter/generator, or PMSG, is driven in the generator mode by a gas turbine shaft at speeds ranging from zero rotations per minute to 50,000 rotations per minute or more to generate electricity for the engine and accessories.

These variations in driving speeds result in proportional variations in PMSG output voltage. The output voltage of the PMSG also varies as various loads are applied, this effect is also referred to as a V-I load characteristic, an example of which is shown in FIG. 1. For instance, at aircraft take-off, when turbine speed is highest, a maximum voltage of 110 Volts AC may be generated when the generator is not loaded, while in an engine idle mode, a 30 Volts AC voltage may be generated by the PMSG under full load conditions. A sample V-I load characteristic for 55V is shown in FIG. 1.

Aircraft onboard equipment is usually driven using 28 volts DC voltage. Furthermore, a variable load current may be drawn by the engine and aircraft accessories. Therefore, the wild voltage and frequency AC electricity generated by the PMSG is preferably regulated into a constant voltage DC output to drive these accessories. Although some regulation solutions are known, there remains a need for a scheme which provides regulation across the complete spectrum of speeds and loads present in the typical prime-mover gas turbine PMSG system.

One technique, known as saturation control, employs saturable core reactors in conjunction with a pulse width modulation scheme, typically a switched-mode power supply or SMPS, wherein the output current flowing through the saturable inductor saturates the inductor at high currents, and does not saturate the inductor at lower currents, and thereby may regulate output voltage.

This device is sometimes referred to as a magnetic amplifier or "Magamp". Saturation-based voltage regulation systems, however, are typically not effective at all load current levels, and therefore improvement is needed.

Furthermore, it will be appreciated that in the case of aircraft applications, it is necessary to provide the output voltage with a very high reliability, at low cost and using a low weight solution. The technological challenges are therefore many.

There is therefore a need for a voltage regulation method and apparatus that will address at least the above-identified challenges.

SUMMARY OF THE INVENTION

It is an object of the invention to regulate output voltage from a variable source.

According to a first aspect of the invention, there is provided a control circuit for providing, in a voltage regulated circuit, a regulated voltage output from a variable voltage and frequency source in a primary circuit having at least two primary inductors in series. The control circuit comprises at least two secondary inductors associated respectively with the two primary inductors by two common saturable cores to thereby form at least two electromagnetic assemblies. The control circuit further comprises a saturation control unit capable of controlling a saturation level of the cores via the secondary inductors, and a voltage cancelling unit capable of providing an adjustable voltage source to the secondary inductors. The adjustable voltage source is out-of-phase with voltage, in the voltage regulated circuit. Finally, the control circuit comprises a selection unit for selecting, depending on a feedback signal from the voltage regulation circuit, one of the saturation control unit and the voltage cancelling unit to be active to control the regulated voltage output via the electromagnetic assemblies.

According to another aspect of the invention, there is provided a method for providing a regulated voltage output from a variable voltage and frequency source in a primary circuit. The method comprises the steps of obtaining a feedback signal indicative of the voltage output; determining from the feedback signal whether a threshold has been reached; and selecting one of a first control mode and a second control mode. The first control mode includes controlling a saturation level in at least two series saturable core inductors in the primary circuit to thereby controllably change a voltage drop across the at least two inductors. The second control mode includes providing a variable voltage signal to secondary inductors associated via the cores with the series primary inductors. The variable voltage signal is controllably out-of-phase with the primary circuit to thereby selectively cancel at least a portion of the voltage in the primary circuit.

According to yet another aspect of the invention, the is provided an apparatus for regulating voltage from a variable voltage and frequency source. The apparatus comprises a primary circuit including the source and at least two series primary inductors each provided on respective saturable cores. The apparatus also comprises a secondary circuit including at least two series secondary inductors respectively associated with the two primary inductors via the saturable cores. The secondary circuit further including at least a saturation apparatus communicating with the secondary inductors, a voltage cancellation apparatus communicating with the secondary inductors and a control apparatus for controlling operation of the secondary circuit. The saturation apparatus is adapted to selectively saturate the saturable cores. The voltage cancellation apparatus is adapted to selectively provide alternating current electricity to the secondary inductors which is out-of-phase with alternating current electricity in the primary circuit. The control apparatus is adapted to control an operational status of at least one of the saturation apparatus and the voltage cancellation apparatus.

In still another aspect of the invention, there is provided an apparatus for regulating output voltage from a variable voltage and frequency source-. The apparatus comprises a primary circuit including the source and at least two series primary inductors each provided on a saturable core; a secondary circuit including at least two series secondary inductors respectively coupled with the two primary inductors via the saturable cores to provide two series inductor pairs; a first apparatus in the second circuit for regulating the voltage in the primary circuit via the coupled series inductor pairs, the first apparatus adapted to controllably reduce an output voltage of the primary circuit to a desired output level; a second apparatus in the second circuit for regulating the voltage in the primary circuit via the coupled series inductor pairs, the second apparatus adapted to controllably increase the output voltage of the primary circuit to a desired output level; and a selector apparatus adapted to determine when the first and second apparatus are active.

In yet another aspect of the invention, there is provided an apparatus for regulating output voltage from a variable speed permanent magnet generator when connected to a variable load system. The apparatus comprises first electronic means for automatically reducing the output voltage to a desired output level; second electronic means for automatically increasing the output voltage to a desired output level; and a selector apparatus adapted to determine which of said first and second electronic means is active at a given time.

In another aspect of the invention, there is provided a method of regulating the voltage in a primary circuit having a variable voltage and frequency electrical power source. The method comprising the steps of providing at least two series-connected primary inductors in the primary circuit, the primary inductors having respective saturable cores; providing a secondary circuit having at least two series-connected secondary inductors, the secondary inductors each respectively electromagnetically coupled with said primary inductors via said saturable cores; selectively saturating said cores to produce a desired voltage drop across the primary inductors to thereby regulate the voltage in the primary circuit; and selectively providing a cancellation voltage to the secondary inductors to thereby regulate the voltage in the primary circuit.

The above summary of invention is not intended to be limiting of the inventions disclosed herein, as inventions may be disclosed which are not described here.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

Figure 1:
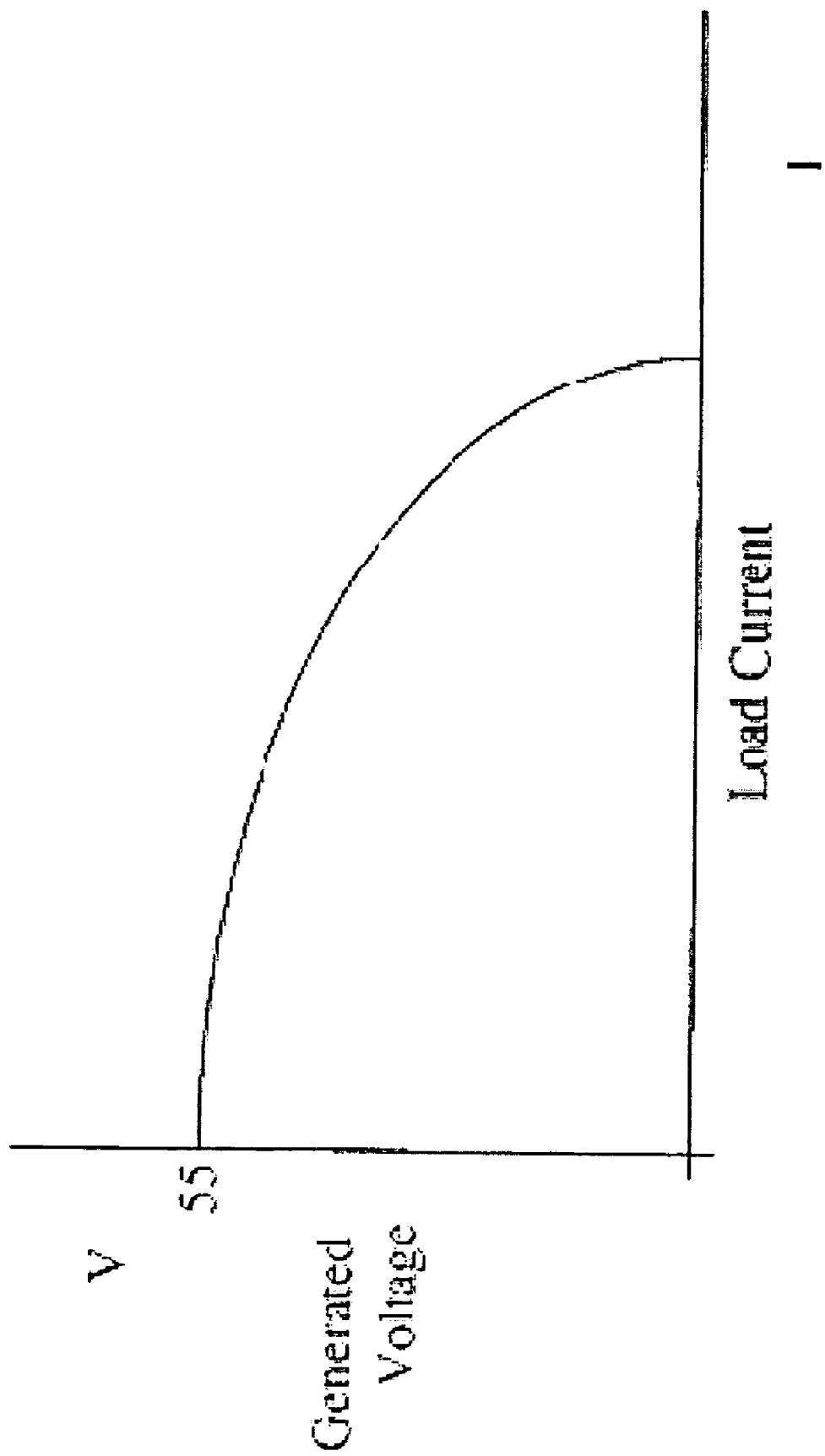
FIG. 1 is a graph which shows a typical V-I load characteristic for a permanent magnet starter generator (PMSG)
Figure 2:
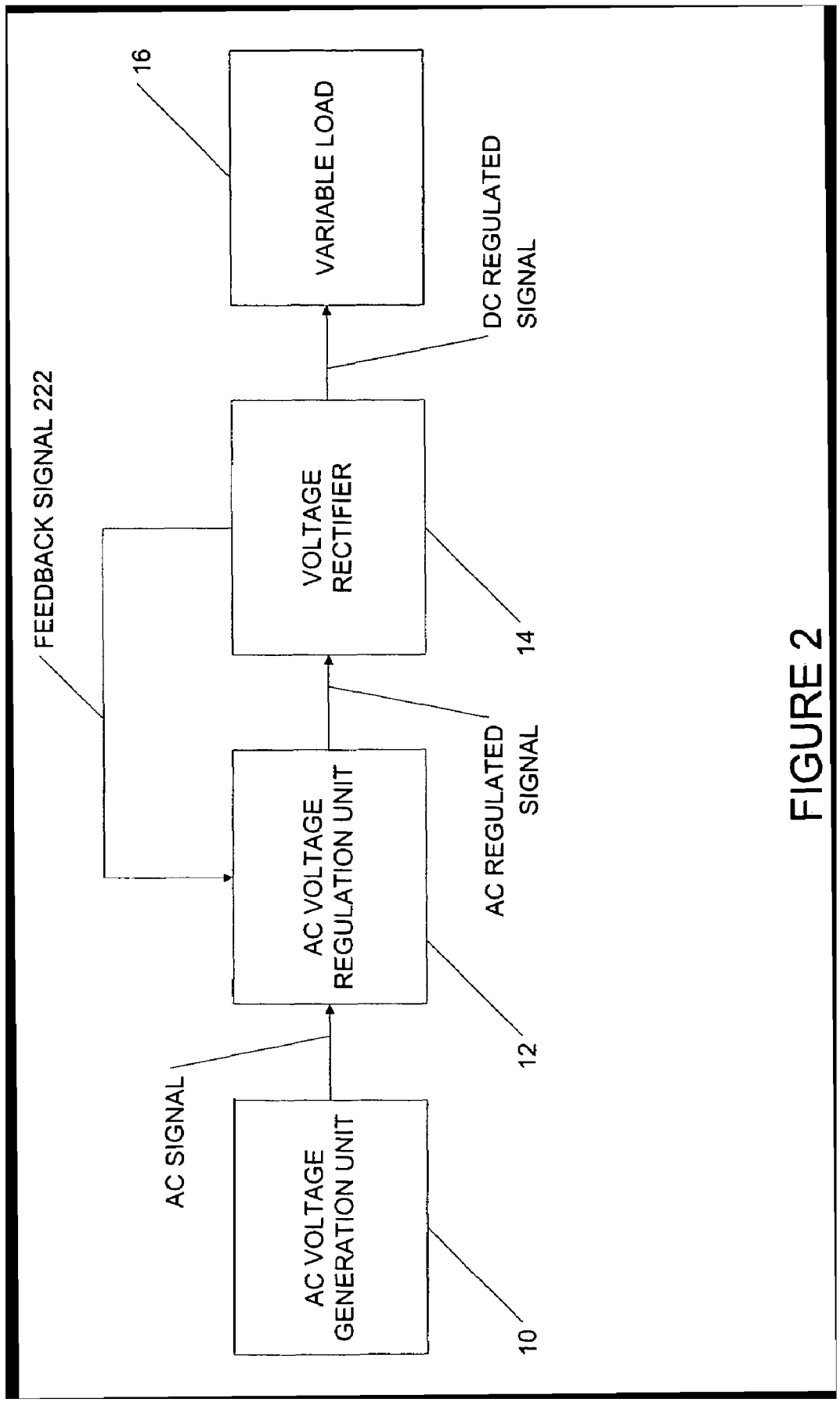
FIG. 2 is a block diagram which shows how a voltage regulation unit is used in the preferred embodiment of the invention.

Now referring to FIG. 2, a block diagram shows a voltage regulation unit according to one preferred embodiment of the invention.

FIG. 2 shows an AC voltage generation unit 10, an AC voltage regulation unit 12, a voltage rectifier 14 and a variable load 16.

The AC voltage generation unit 10 is preferably a permanent magnet starter/generator (PMSG) which is driven by a shaft of a gas turbine engine (not shown), and thereby provides an AC signal having a variable voltage and frequency, which varies as a result of turbine speed variation and inversely with load current demands. The applicant's co-pending application Ser. No. 10/444,952, filed May 27, 2003, hereby incorporated by reference, discloses one example of a suitable PMSG, although almost any PMSG may be used. A constant voltage value, e.g. 28V DC, is required by the variable load 16.

The AC signal is provided to the AC voltage regulation unit 12. Using a feedback signal 222 provided by the voltage rectifier 14, the AC voltage regulation unit 12 provides an AC regulated signal to the voltage rectifier 14. The AC regulated signal has a voltage value which is set such that the rectified output voltage is maintained to the voltage value required by the variable load 16. In this embodiment of the invention, the AC regulated signal is a 28 volts AC regulated signal.

The AC regulated signal is received by the voltage rectifier 14 which provides a DC regulated signal. The DC regulated signal has a voltage value which is equal to the voltage value required by the variable load 16. The DC regulated signal is as required by the associated load system, and typically a 28 volts DC regulated signal, and is provided to the variable load 16.

Figure 3:
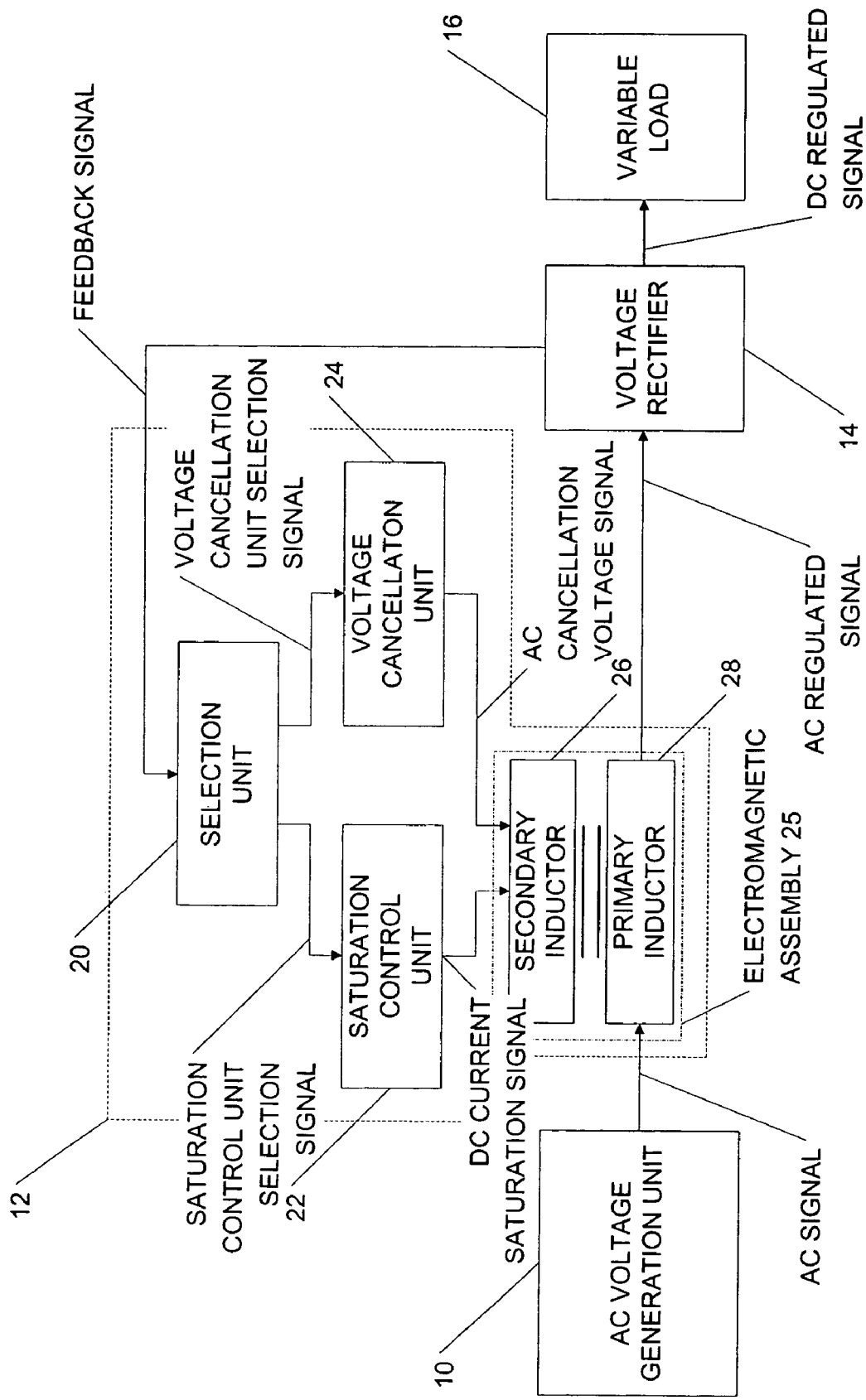
FIG. 3 is a block diagram which shows one embodiment of the voltage regulation unit.

Now referring to FIG. 3, there is shown an embodiment of the AC voltage regulation unit 12. The AC voltage regulation unit 12 comprises a selection unit 20, a saturation control unit 22, a voltage cancellation unit 24 and an electromagnetic assembly 25.

The electromagnetic assembly 25 comprises at least two primary inductors 102 and 104 and two secondary inductors 103 and 105 mutually coupled via respective common saturable cores, not shown in this figure.

The inductors 102 and 103 are mutually coupled via a first common core, and the inductors 104 and 105 are mutually coupled via a second common core. The two cores are magnetically independent of one another. The use of at least two such inductor-core assemblies is preferred, although more than two may also be used.

As discussed further below, the AC voltage regulation unit 12 is adapted to provide the AC regulated signal independently of the demands of variable load 16 and the input voltage level of variable source 10.

The selection unit 20 receives the feedback signal 222 from the voltage rectifier 14. A change in the feedback signal is indicative of a change in the load value and/or the AC voltage generated by the AC voltage generation unit 10, as will be described in more detail below.

According to an aspect of the present invention, depending on the value of the feedback signal 222, the selection unit 20 selects one of the saturation control unit 22 and the voltage cancellation unit 24.

Figure 6:
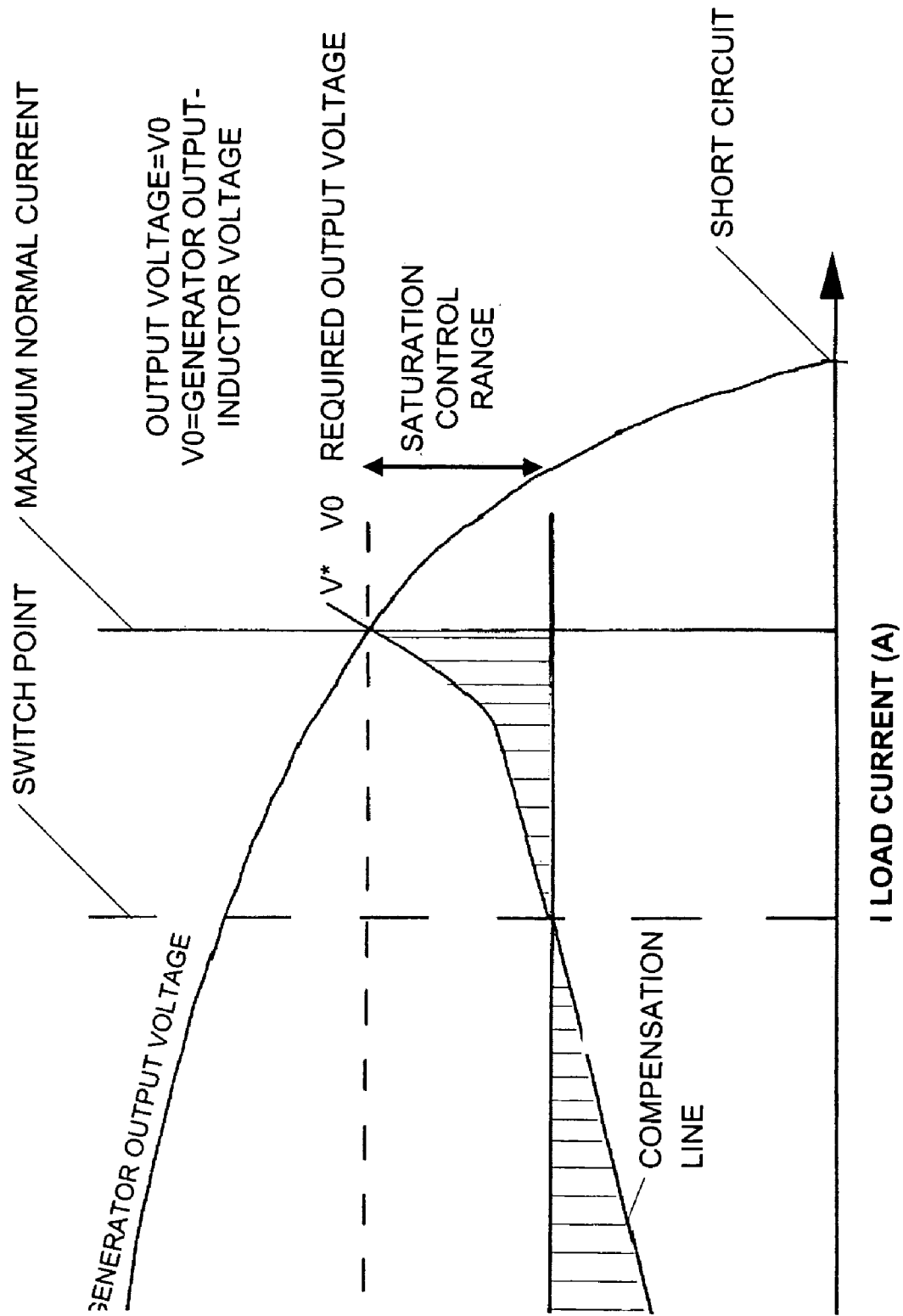
FIG. 6 is a graph which shows an example of a V-I load characteristic; in a first zone, a cancellation control is selected while in a second zone, a saturation control is selected.

Referring to FIG. 6 and as will be described further below, the saturation control unit 22 is selected in the case where the load current or voltage value of the variable load 16 exceeds a predetermined threshold current I* or is lower than a predetermined threshold value V*, as the case may be, while the voltage cancellation unit 24 is selected in the other case.

The selection unit 20 selects between the saturation control unit 22 and the voltage cancellation unit 24. It will be therefore appreciated that two regulation modes are thus provided, the first mode sometimes referred to as "saturation" or DC control and the second mode sometimes referred to as "voltage cancellation" or AC control.

In the first voltage regulation mode, where the saturation control unit 22 is selected, the saturable cores 300, 302 of the electromagnetic assembly 25 are either partially or fully saturated using a DC current saturation signal in order to increase the voltage of the AC signal provided to the voltage rectifier 14 by the AC voltage generation unit 10, as saturating the series-connected inductors 103, 105 reduces the inductive reactance (i.e. xL) of the inductor, thereby reducing the (i.e. xL*I) voltage drop across the inductor, as will be described in more detail below.

This action compensates for the reducing AC voltage from the generation unit 10 as the load current I increases, as shown in FIG. 6. In this first mode, as will be described in greater detail below, the secondary inductor coil is used as a means to control the saturation level of the cores 300, 302 on which both the primary inductor 103 and 105 and the secondary inductor 102 and 104 are wound, through the application of a controlled DC current to the secondary inductor 102 and 104 windings.

In the second mode, where the voltage cancellation unit 24 is selected by the selection unit 20, the secondary inductor 26 of the electromagnetic assembly 25 receives an AC cancellation voltage signal, provided by the voltage cancellation unit 24 which is used to reduce the voltage of the AC signal provided to the voltage rectifier 14 by the AC voltage generation unit 10. This action thus compensates for the increasing AC voltage from the generation unit 10 as the load current I tends toward zero, as shown in FIG. 6. In this second mode, which is preferably activated only under no-load or low-load conditions, as will be described in greater detail below, a variable AC voltage is supplied to the secondary inductor 26 in proper phase relative to the generated voltage such that a voltage subtraction control mode is provided. This results in the ability to lower voltage across the primary inductor 28 even when there is no AC load current flow through the inductor 28. This voltage drop is non reactive and is attributable to a vector summing of the generated voltage with the AC control voltage via the transformer action of the coupled inductors, as will be described in more detail below.

As is well known, various feedback signal conditioning may be applied to optimize the system response characteristics such as, for example, adjusting the gain of the feedback signal 222 to optimize control stability.

As will be appreciated by the skilled reader, in practical terms the feedback signal conditioning required/desired depends on the saturation characteristics of the particular material used for the core and on the voltage regulation specifications for a given system, and thus will not be described in further detail here.

Figure 4:
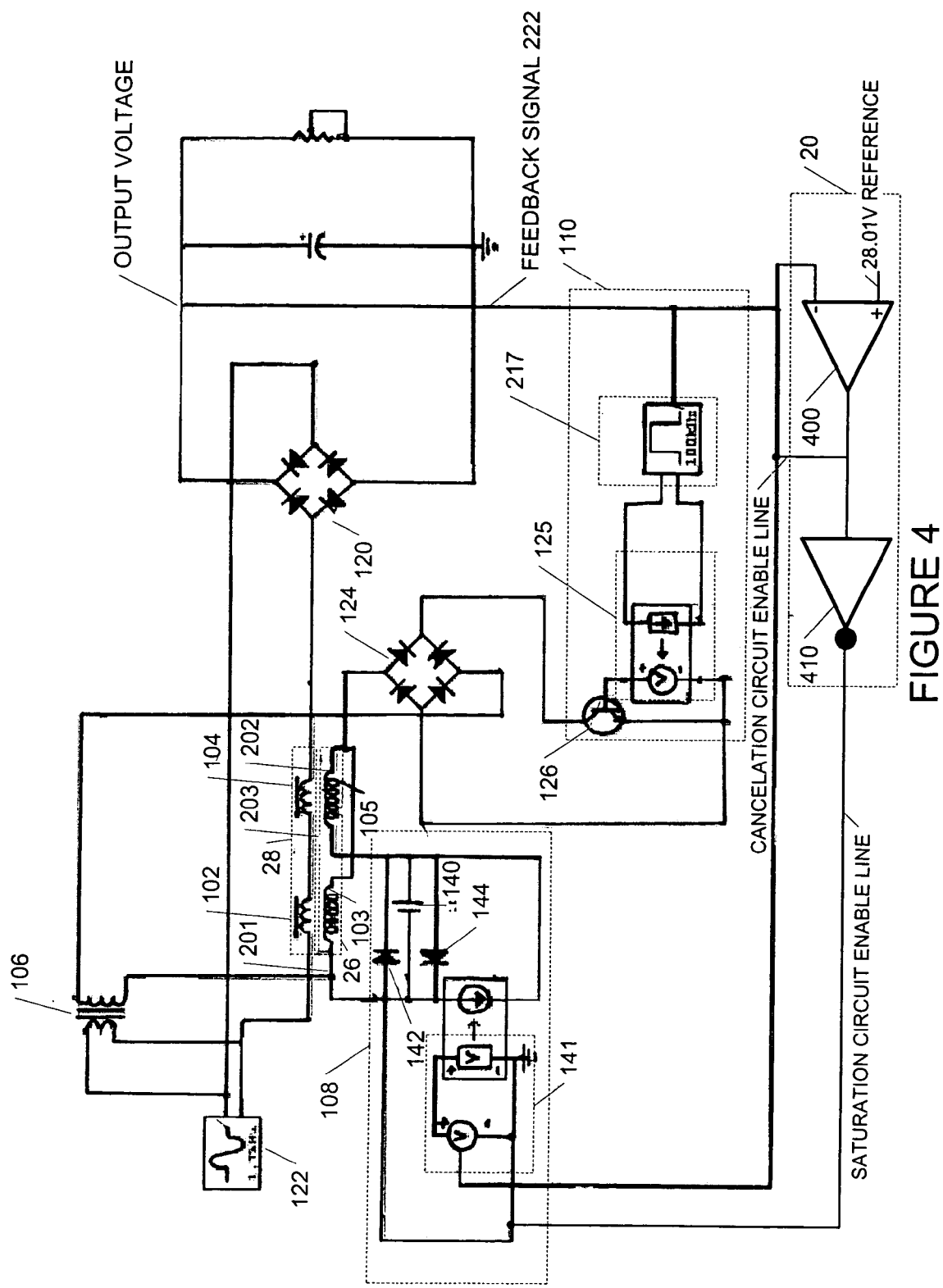
FIG. 4 is a functional electronic schematic which shows an embodiment of the voltage regulation unit.
Figure 5:
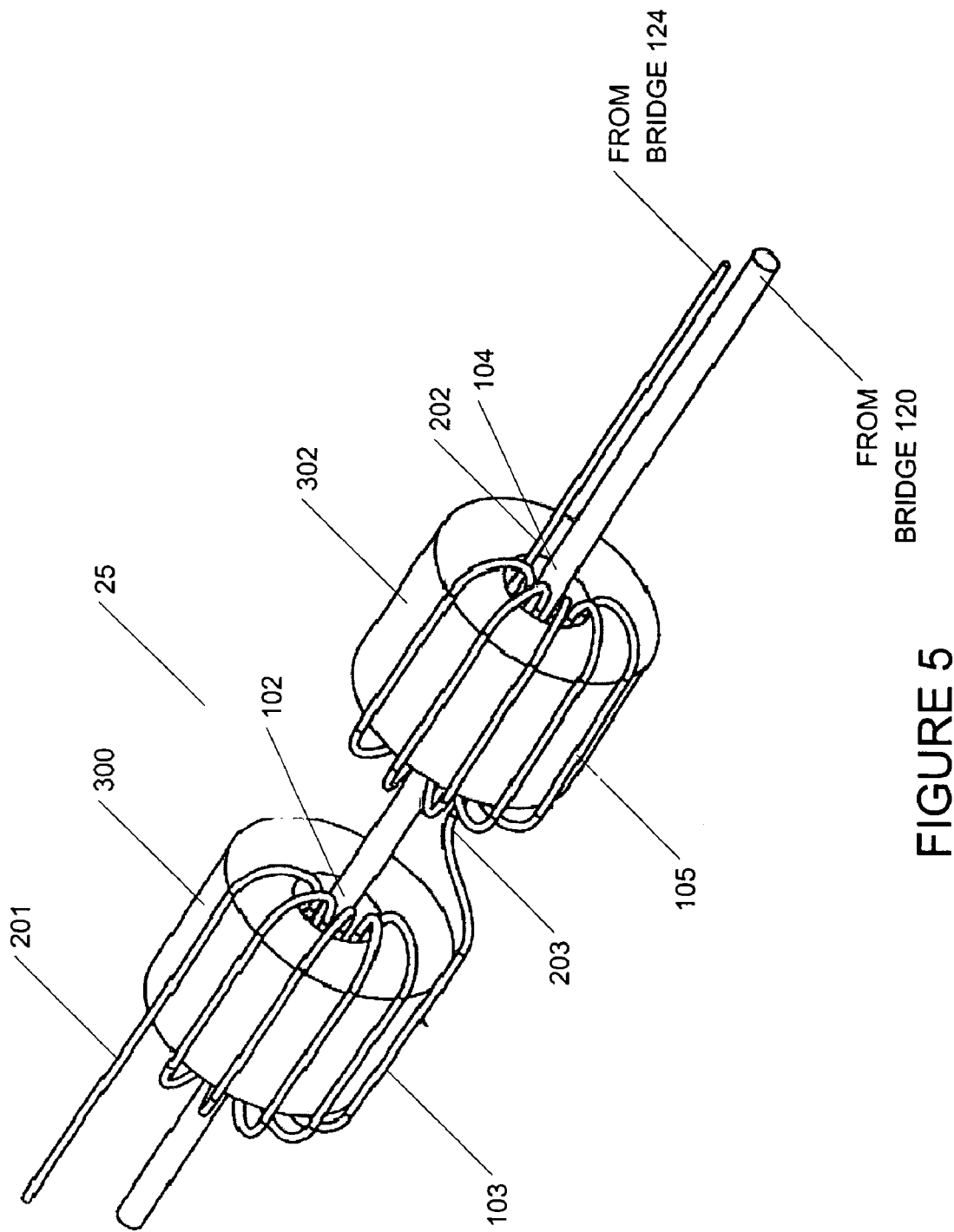
FIG. 5 is a perspective view of a saturable reactor assembly in accordance with an embodiment of the invention.

Now referring to FIGS. 3, 4, and 5, there is shown an electronic schematic which discloses an embodiment of the voltage regulation unit 12.

In the present embodiment, an electromagnetic assembly 25, comprising series inductors 102 and 104, providing the primary inductor 28, and series inductors 103 and 105, providing the secondary inductor 26, are provided around respective common saturable cores 300 and 302, as shown in FIG. 5, in conjunction with a step-up transformer 106. Also present is a saturation control unit 108, a voltage cancelling unit 110, a voltage rectifier 120 and the AC variable voltage and frequency voltage source 122. It will be understood that these elements correspond respectively to elements 22, 24, 14 and 10 in FIG. 3.

The saturable core inductor assembly 26-28 of the present invention enables the regulation of a DC voltage over a full operating load range of from 0 load to full load, as will now be described.

In this embodiment, the primary and secondary inductors 28, 26, respectively, are provided in series pairs. The first saturable core reactor pair comprises the inductors 102, 103 mutually coupled to a common saturable core 300, while the second saturable core reactor pair comprises inductors 104 and 105 also mutually coupled to a common saturable core 302.

The first and the second saturable core reactor pairs are preferably configured such that when a DC current signal flows from the saturation control unit 108 between terminal 201 and terminal 203, each of the saturable core inductor 103 and the saturable core inductor 105 is pushed toward its saturation flux density. The skilled addressee will appreciate that, at relatively low DC current signal, minimal or no saturation is achievable while, at higher DC current signal, total saturation may be obtained.

In this embodiment, series primary-secondary inductor pairs (i.e. 102-103 and 104-105) are wound opposite to one another about their respective cores, as shown in FIGS. 4 and 5. The direction or polarity of magnetic saturation in each core is therefore opposite each other relative to the flux generated in the cores by primary current, i.e. the AC current signal flowing from the AC source 10, flowing through the series saturable inductors 102 and 104.

In the first mode, when an AC current signal flows from the AC source 10 through the inductors 102 and 104, an increase of a DC current signal in the inductor 103 and in the inductor 105 causes one of the saturable cores 300 and 302 to begin to-saturate for a positive AC current signal flow in the primary inductor 28, i.e., during a half of an AC cycle, while the other core will saturate for a negative AC current signal flow in the primary inductor 28. The skilled -addressee will appreciate that this happens because the flux developed by the DC current signal is added vectorially to the flux developed by the AC current signal.

It will be appreciated that with higher DC current signals, both cores may be designed (if desired) in order to remain saturated for both the positive and the negative polarity of the AC current signal flowing in the primary inductor 28.

Saturating the core of an inductor results in a reduction of the incremental permeability of the cores 300 and 302, and, as a result, a reduction in the effective inductance value (L) of the coil formed by the winding and the core. At zero saturation value, the inductance value (L) and, as a result, the inductive reactance are maximum, and are set by the core permeability, core dimensions and the number of turns of wire of the coil.

It will be appreciated that such inductive reactance results in a controlled reactive voltage drop across the saturable core inductor 102 and the saturable core inductor 104 when an AC current signal flows through the saturable core inductors 102 and 104. It will be appreciated that the voltage drop is $V_L = I \cdot X_L$, where the inductive reactance $X_L = 2 \cdot \pi \cdot f \cdot L$. The relationship between the primary and secondary is otherwise governed by transformer rules, i.e., $N_p V_p I_p = N_c V_c I_c$.

As the DC current signal is increased, the inductance (L) is reduced until a full DC current signal where the inductance (L) approaches the free space inductance of the winding, thus resulting in virtually no voltage drop.

Therefore, the arrangement of the inductors 102 and 104 relative to inductors 103 and 105 and coupled by common saturable cores 300 and 302, therefore enables the adjustment of the voltage applied to the voltage rectifier 120, from either a fixed or variable voltage source.

Such adjustment is performed with minimum heat production, which would not be the case in a voltage drop generated using an assembly comprising resistances.

The saturation control unit 108 preferably further comprises a capacitor 140 which has a low impedance at the source frequency such that in AC terms, the terminal 201 and the terminal 203 of the secondary inductor 26 are connected together.

Under DC control conditions, the current signal flow is between the terminal 201 and the terminal 203. Diodes 142 and 144 act as clamping devices such that slight differences in saturation characteristics of the two cores are balanced out. The DC resistance of the saturation inductors 103 and 105 are kept low in order to avoid any significant DC voltage development under DC control current conditions to avoid forward biasing of these diodes. An opto-isolator 141 or other voltage-to-current converter converts the feedback signal into a DC current and provides electrical isolation.

As described briefly above, the skilled addressee will appreciate that in such saturation control arrangement, the voltage drop $V_L$ is also a function of the AC current signal, i.e. load current, passing through the primary inductor 28. In the case of a low- or no-load current condition, the voltage drop across the primary inductor 28 will be almost zero. As a result the voltage source 122 may not be properly regulated in the case of a low- or no-load condition.

Consequently, the invention also provides a second voltage regulation mode for use in low- or no-load situations. This second, or voltage cancellation, mode operates on principles as will now be described.

As the load current drawn by the variable load 16 approaches a low- or no-load condition, the DC saturation current signal also approaches zero, based on the input received from feedback signal 222. Such DC saturation current signal is controlled using a separate circuit, e.g., saturation circuit 108 using feedback 22 from the main circuit, and as such, the primary inductor 28 and the secondary inductor 26 are operating as linear, i.e. un-saturated, magnetic components when the DC saturation current signal is below the saturation level.

Under such conditions, the windings of the secondary inductor 26 when taken as individual windings, e.g. 103 and 105, act as transformer windings together with their counterpart windings of the primary inductor 28. The net AC voltage between the terminal 201 and the terminal 203 is zero as the windings of the secondary inductor 26 are wound in opposite directions in this embodiment. Likewise, the AC voltage between the terminal 201 and the terminal 202 is equal to the AC voltage between the terminal 203 and the terminal 202.

With this configuration, when an AC current signal of the correct phase and frequency is applied between the terminal 203 and the terminals 201 and 202, an AC voltage will be induced in the primary inductor 28, which purposely opposes the voltage source 122 such that the rectifier 120 input voltage, i.e., the voltage applied to the rectifier 120 circuit, may be reduced even when there is a zero current flow, thus regulating the system output voltage to the rectifier 120 even when there is little or no current flow in the primary inductor 28.

Still referring to FIG. 4, the voltage cancellation unit 110, preferably having a full wave rectifier/transistor configuration comprising a diode bridge 124, a transistor 126, a pulse width modulation (PWM) circuit 217 and an isolator 125, is used in order to switch the output of the step-up control transformer 106 to provide the correct (i.e. inverted) phase and frequency signal relative to source 122, into the electromagnetic assembly 25, such that an adjustable AC voltage signal of a suitable phase and frequency is applied to the terminal 202 for the cancellation of the source voltage as required to controllably reduce the voltage of the signal supplied to the output rectifier 120.

In the described embodiment, the voltage cancellation source comprises the transformer 106 connected to the variable voltage source 122, however, other arrangements are possible, such as providing a separate voltage source directly from the generator 122 to provide the voltage cancellation source signal.

As previously mentioned, the voltage cancellation unit 110 also comprises an appropriate PWM circuit 217, for pulse width modulated control of the transistor 126, and is provided for performing a proportional adjustment of the AC current signal applied to the saturable core inductors 103 and 105 of the secondary inductor 26. The pulse width modulation for controlling the transistor 126 is preferably performed by the circuit 217 at a much higher frequency than the frequency of the voltage source 122. It has been contemplated that 10:1 would be a suitable ratio but that higher ratios would also be suitable. The ratio is preferably selected to minimize the currents being switched by the control circuitry, and is therefore the highest practical voltage levels that can be reliably applied to cost effective devices. When high current are present in the primary circuit, it is preferable to use low-current/high-voltage control circuitry to thereby minimize cost of the control circuits. Pulse width modulation of the transistor 126 in this arrangement results in the diode bridge rectifier 124 appearing as a variable impedance element in the transformer 106 secondary circuit, enabling a smooth adjustment of the transformer 106 secondary current signal flow in the circuit comprising the saturable inductor core 103 and the saturable core inductor 105 in parallel connection in this mode, thereby forming the input side of a voltage cancellation transformer (the output side of the transformer is the series connected inductors 102 and 104).

It will be appreciated that by the skilled addressee that PWM is a common control technique for controlling the average current or voltage in a circuit.

Referring again to FIG. 6, the second or voltage cancellation mode of voltage regulation provides voltage control in a subtractive fashion. During the portion of output cycle where voltage exceeds the required output voltage, e.g. 28V, as sensed from feedback signal 222, the excess voltage generated by PMSG 122 is essentially inverted to become 180° out-of-phase by the transformer 106 or alternately, by the electromagnetic assembly 25 and then "fed back" to the output circuit via electromagnetic assembly 25, acting as a transformer, to cancel any voltage component in excess of the required target.

The switch-over threshold current I* or voltage V* may be set according to the designer's preference. In this embodiment, the selection unit 20 preferably electronically switches from the first mode to the second mode based on a threshold DC output voltage V*, as will now be described.

Referring to FIGS. 4 and 6, the selection unit 20 preferably comprises a voltage comparator 400 and an inverter 410.

If the DC output voltage, as determined from the feedback signal 222, is higher than 28.01 volts, the voltage cancellation unit 110 is activated to regulate the output voltage of PMSG source 10/122, as described above.

If the DC output voltage is lower than 28.01 volts, the saturation unit 108 is selected for saturation control, as described above.

This arrangement advantageously automatically ensures that only one or the other mode is selected at a time. A voltage threshold is preferred since temperature effects on component performance may cause the voltage to change at a given current and as such controlling the switch point based on current would not be satisfactory.

Figure 7:
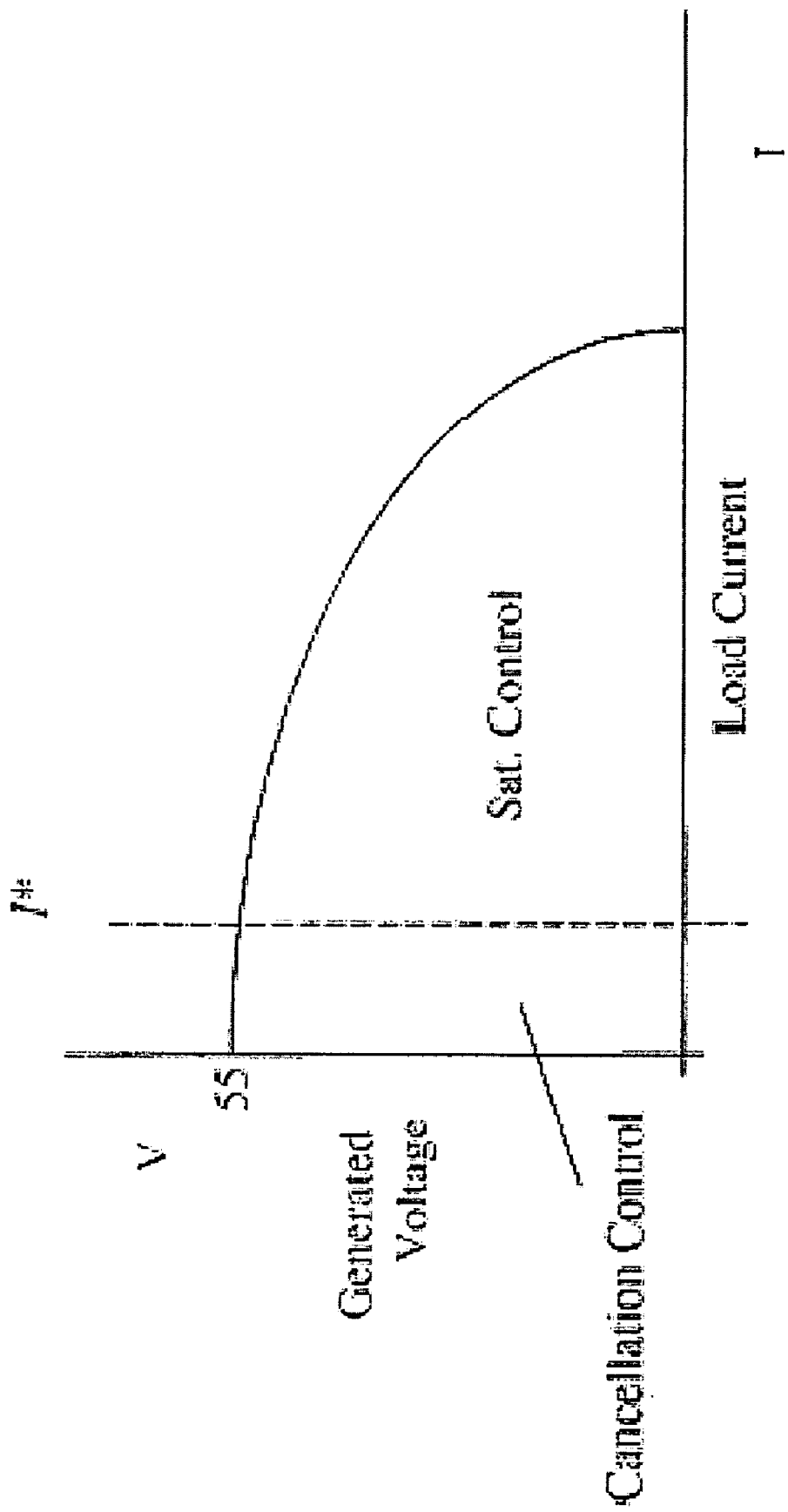
FIG. 7 is a graph which shows an example of a V-I load characteristic for another embodiment of the invention.

In an alternate embodiment (see FIG. 7), switching is performed from the first to the second mode when the control current is zero, or as close thereto as desired, and from the second mode back to the first mode when the AC control pulse width value approaches zero, i.e., the control loop adjusts itself to obtain the desired voltage output via the feedback signal conditioning, and mode switching occurs when the mode in use runs out of range.

Consequently, the present AC voltage regulation circuit 12 may provide regulation of the voltage applied to the voltage rectifier circuit 14 over a range of zero to full load.

Also, the disclosed scheme advantageously provides step-up transformer 106 to step up the voltage, and step down the current, provided to the voltage regulation control circuit 12, to thereby enable the voltage regulation control circuit 12 to use high voltage-low current control electronics. The output of the AC voltage generation unit 10 is high current, however, high-current electronics are expensive and heavy. The present invention, therefore enables the control circuitry to use high-voltage/low current electronic components, which are much cheaper and lighter than their "high I" counterparts.

FIG. 5 shows a mechanical arrangement for a saturable reactor assembly in accordance with an embodiment of the invention.

The saturable reactor assembly comprises the inductors 102, 103, 104 and 105 as described herein above, coupled by the saturable torroidal cores 300 and 302. Depicted is a sort of split transformer comprising halves, which are reverse-wound relative to each other.

In FIG. 5, the windings 102 and 104 are shown as single-turn windings, while windings 103 and 105 are multi-turn windings.

The embodiments of the invention described above are intended to be exemplary only.

For example, it will be appreciated that the embodiments are described in terms of single phase for clarity purposes and that the teachings may be extended to n-phase AC voltage regulation. The invention is not limited in application to PMSG or gas turbine applications, but to any permanent magnet generator or alternator. The saturable inductors 103 and 105 need not be reverse-wound, but rather the primary inductors 102 and 104 may be. Likewise, another arrangement having a similar effect may also be used. Embodiments of the present invention may also be provided using, for example, only the presently-disclosed cancellation apparatus, or only the presently-disclosed saturation apparatus, alone or combination with other apparatus. Though torroidal transformers having an n:1 secondary-primary turns ratio is disclosed, any suitable transformer and turns ratio may be used. Any suitable number of series-connected primary and secondary inductors may also be used.

The scope of the invention is therefore intended to be limited solely by the scope of the appended claims.

We claim:

1. A control circuit for providing, in a voltage regulated circuit, a regulated voltage output from a variable voltage and frequency source in a primary circuit having at least two primary inductors in series, said control circuit comprising:
   at least two secondary inductors associated respectively with the two primary inductors by two common saturable cores to thereby form at least two electromagnetic assemblies;
   a saturation control unit capable of controlling a saturation level of said cores via said secondary inductors;
   a voltage cancelling unit capable of providing an adjustable voltage source to said secondary inductors, said adjustable voltage source being out-of-phase with voltage in the voltage regulated circuit; and
   a selection unit for selecting, depending on a feedback signal from said primary circuit, one of said saturation control unit and said voltage cancelling unit to be active to control said regulated voltage output in said primary circuit via said electromagnetic assemblies.

2. The control circuit as claimed in claim 1, wherein said voltage output comprises a DC voltage value, and wherein said selection unit activates, depending on said DC voltage value, one of said voltage cancelling unit and said saturation control unit.

3. The control circuit as claimed in claim 2, wherein said saturation control unit is selected when said DC voltage value is smaller than a predetermined value, while said voltage cancelling unit is selected otherwise.

4. The control circuit as claimed in claim 1, wherein said feedback signal corresponds to at least one of a voltage output and a DC current value in said control circuit, and wherein said selection unit activates, depending on said DC current value, one of said voltage cancelling unit and said saturation control unit.

5. The control circuit as claimed in claim 4, wherein said saturation control unit is selected when said DC current value is larger than a predetermined value, while said voltage cancelling unit is selected otherwise.

6. The control circuit as claimed in claim 1, wherein said at least two primary inductors comprise a first inductor and a second inductor, further wherein said at least two secondary inductors comprise a third inductor and a fourth inductor, located adjacently to said first inductor and to said second inductor, further wherein said third inductor and said fourth inductor are wound about their respective cores in opposite directions relative to their respective primary inductors.

7. The control circuit as claimed in claim 1, wherein said adjustable voltage source comprises a supply transformer connected to said variable voltage source.

8. A method for providing a regulated voltage output from a variable voltage and frequency source in a primary circuit, said method comprising:
   obtaining a feedback signal from the primary circuit, said feedback signal being indicative of said voltage output;
   determining from the feedback signal whether a threshold has been reached; and
   selecting one of a first control mode and a second control mode,
   wherein the first control mode includes controlling a saturation level in at least two series saturable core inductors in the primary circuit to thereby controllably change a voltage drop across the at least two inductors, and
   wherein the second control mode includes providing a variable voltage signal to secondary inductors associated via said cores with said series primary inductors, the variable voltage signal being controllably out-ofphase with the primary circuit to thereby selectively cancel at least a portion of the voltage in the primary circuit.

9. The method as claimed in claim 8, wherein said voltage output comprises a DC voltage value, and wherein said determining depends on said DC voltage value.

10. The method as claimed in claim 9, wherein said determining comprises activating said saturation control when said DC voltage value is smaller than a predetermined value, and providing said variable voltage signal otherwise.

11. The method as claimed in claim 8, wherein said voltage output corresponds to a DC current value in said secondary inductor, and wherein said determining depends on said DC current value.

12. The method as claimed in claim 11, wherein said determining comprises activating said saturation control when said DC current value is larger than a predetermined value, and providing said variable voltage signal otherwise.

13. The method as claimed in claim 8, wherein said variable voltage signal provides two equal, but substantially opposite, voltages in said secondary inductors.

14. The method as claimed in claim 13, wherein said two equal voltages are substantially 180 degrees out-of-phase.

15. An apparatus for regulating voltage from a variable voltage and frequency source, the apparatus comprising:
a primary circuit including the source and at least two series primary inductors each provided on respective saturable cores; and
a secondary circuit including at least two series secondary inductors respectively associated with the two primary inductors via the saturable cores, the secondary circuit further including at least a saturation apparatus communicating with the secondary inductors, a voltage cancellation apparatus communicating with the secondary inductors and a control apparatus for controlling operation of the secondary circuit,
wherein the saturation apparatus is adapted to selectively saturate the saturable cores,
wherein the voltage cancellation apparatus is adapted to selectively provide alternating current electricity to the secondary inductors which is out-of-phase with alternating current electricity in the primary circuit, and
wherein the control apparatus is adapted to control, using a feedback signal from the primary circuit, an operational status of at least one of the saturation apparatus and the voltage cancellation apparatus to regulate the voltage in said primary circuit.

16. The apparatus of claim 15 wherein said primary series and said secondary series inductors form series primary-secondary inductor pairs wound about respective said cores, and wherein the pairs are wound in opposite directions relative to one another.

17. The apparatus of claim 15 wherein only the secondary inductor pairs are wound around the respective cores, and wherein the primary inductors merely pass adjacent the respective cores, to thereby provide a n:1 secondary-to-primary turns ratio relative to said cores.

18. The apparatus of claim 15 wherein the saturation apparatus provides a saturation signal to the secondary inductors to thereby selectively saturate the saturable cores.

19. The apparatus of claim 15 wherein the control apparatus uses a feedback signal obtained from the primary circuit to determine said operational status.

20. The apparatus of claim 15 wherein the control apparatus permits only one of the saturation apparatus and voltage cancellation apparatus to operate on the secondary inductors at any given time.

21. An apparatus for regulating output voltage from a variable voltage and frequency source, the apparatus comprising:
a primary circuit including the source and at least two series primary inductors each provided on a saturable core;
a secondary circuit including at least two series secondary inductors respectively coupled with the two primary inductors via the saturable cores to provide two series inductor pairs;
a first apparatus in the second circuit for regulating the voltage in the primary circuit via the coupled series inductor pairs, the first apparatus adapted to controllably reduce an output voltage of the primary circuit to a desired output level;
a second apparatus in the second circuit for regulating the voltage in the primary circuit via the coupled series inductor pairs, the second apparatus adapted to controllably increase the output voltage of the primary circuit to a desired output level; and
a selector apparatus adapted to determine when said first and second apparatus are active based upon a feedback signal from the primary circuit.

22. The apparatus of claim 21 wherein said primary series and said secondary series inductors form series inductors pairs wound about respective said cores, and wherein the pairs are wound in opposite directions relative to one another.

23. A method of regulating the voltage in a primary circuit having a variable voltage and frequency electrical power source, the method comprising the steps of:
providing at least two series-connected primary inductors in the primary circuit, the primary inductors having respective saturable cores;
providing a secondary circuit having at least two series-connected secondary inductors, the secondary inductors each respectively electromagnetically coupled with said primary inductors via said saturable cores;
selectively saturating said cores to produce a desired voltage drop across the primary inductors to thereby regulate the voltage in the primary circuit; and
selectively providing a cancellation voltage to the secondary inductors based upon a feedback signal from the primary circuit to thereby regulate the voltage in the primary circuit.

24. The method of claim 23 wherein only one of the steps of selectively saturating said cores and selectively providing a cancellation voltage is performed at any given time.

25. The method of claim 23 wherein the step of selectively saturating said cores includes providing a saturation current to the secondary inductors.

26. The method of claim 23 wherein the steps of selectively providing a cancellation voltage includes providing an alternating current voltage to the secondary inductors which is opposite in phase to an alternating current voltage in the primary circuit.

27. The method of claim 23 wherein the step of selectively saturating said cores includes increasing an output voltage of the primary circuit to a nominal output level.

28. The method of claim 23 wherein the steps of selectively providing a cancellation voltage includes decreasing an output voltage of the primary circuit to a nominal output level.

29. The method of claim 23 wherein the steps of providing secondary inductors coupled with the primary inductors includes the step of coupling the inductors such that a first primary-secondary pair is wound about its respective core in an opposite direction to a direction which the other primary-secondary pair is wound about its respective core.

* * * * *